United States Patent [19]
Herbst

[11] Patent Number: 6,083,107

[45] Date of Patent: Jul. 4, 2000

[54] TORSIONAL VIBRATION DAMPER

[75] Inventor: Rüdiger Herbst, Rochester, Mich.

[73] Assignee: Mannesmann Sachs AG, Schweinfurt, Germany

[21] Appl. No.: 09/266,403

[22] Filed: Mar. 10, 1999

[30] Foreign Application Priority Data

Apr. 17, 1998 [DE] Germany .......................... 198 17 014

[51] Int. Cl.[7] .................................................. F16D 13/64
[52] U.S. Cl. ...................... 464/64; 192/204; 192/213.22; 464/68
[58] Field of Search ............................... 192/204, 213.2, 192/213.21, 213.22; 464/64, 68

[56] References Cited

U.S. PATENT DOCUMENTS

| | | | |
|---|---|---|---|
| 4,548,309 | 10/1985 | Braun ....................................... | 192/204 |
| 4,591,348 | 5/1986 | Takeuchi et al. ......................... | 464/64 |
| 4,684,007 | 8/1987 | Maucher ............................. | 192/213.22 |
| 5,246,398 | 9/1993 | Birk et al. ............................ | 192/204 X |
| 5,725,080 | 3/1998 | Lohaus ............................. | 192/213.22 X |
| 5,785,599 | 7/1998 | Reik ......................................... | 464/68 |
| 5,884,743 | 3/1999 | Kleifges et al. .................... | 192/204 X |
| 5,909,790 | 6/1999 | Lohaus ................................ | 192/213.22 |

FOREIGN PATENT DOCUMENTS

| | | | |
|---|---|---|---|
| 33 13 850 | 10/1984 | Germany ........................ | F16D 13/64 |
| 195 45 973 | 6/1997 | Germany ........................ | F16D 13/64 |

*Primary Examiner*—Rodney H. Bonck
*Attorney, Agent, or Firm*—Cohen, Pontani, Lieberman & Pavane

[57] ABSTRACT

A torsional vibration damper includes a hub element, and a hub-disk assembly which is mounted on the hub element by means of a bearing assembly. The bearing assembly is prestressed by a first prestressing arrangement in the bearing seat against the hub element. The hub-disk assembly has a first transmission and a second transmission, which is rotatable about an axis of rotation in relation to the first transmission arrangement, and a first damping arrangement, preferably a damping spring, which acts between the first and the second transmission arrangements. A friction device generates a friction damping force at a relative rotation between the first and second transmissions. The friction device includes at least one friction element which is acted upon by a second prestressing arrangement and is displaceable on at least one transmission arrangement of the first and second transmission arrangements at a relative rotation with generation of the friction damping force. The bearing arrangement forms at least one part of the at least one friction element.

20 Claims, 4 Drawing Sheets

TORSIONAL VIBRATION DAMPER

BACKGROUND OF THE INVENTION

1. Field of the Invention

The present invention relates to torsional vibration dampers, and in particular to an arrangement for a torsional vibration damper in a clutch disk.

2. Description of the Related Art

A torsional vibration damper of this type is known, for example, from DE 195 45 973 C1. In said known torsional vibration damper, a hub disk meshes with a hub element, thus permitting a predetermined free angle of rotation between the hub disk and the hub element. Acting between the hub disk and the hub element, and arranged on one side of the hub disk, is a damping arrangement of an idling damper. Furthermore, covering-disk elements are arranged respectively on each axial side of the hub disk. The two covering-disk elements and the hub disk form respective transmission arrangements of a load damper. Acting between said two transmission arrangements, i.e. the two covering-disk elements on the one hand and the hub disk on the other hand, is a further damping arrangement in the form of damping springs. The hub disk, the covering-disk elements and the idling damper or components thereof form a hub-disk arrangement which is mounted on the hub element via a bearing ring. For this purpose, the hub ring has a conical bearing surface which rests against a bearing surface of complementary shape on the hub element. Here the bearing ring is supported in the axial direction on one of the covering-disk elements. Acting between the hub element and the other one of the covering-disk elements is a prestressing spring, which braces the bearing ring between the first-mentioned covering-disk element and the hub element. Furthermore, in this torsional vibration damper, a friction device is provided, which becomes active whenever a relative rotation between the two transmission arrangements occurs. This friction device comprises a friction element which is clamped between one of the covering-disk elements and a component which is fixed against rotation to the hub disk. In order to clamp the friction element between the two components mentioned a prestressing force is generated by means of a second spring arrangement in the form of a corrugated washer.

In this known torsional vibration damper, there are therefore two spring arrangements which, independently of one another, provide the prestressing force for the axial prestressing of the entire hub-disk arrangement in relation to the hub element and the prestressing force to generate the friction damping force. On account of the various functions, i.e. centering by means of the bearing ring, generation of the frictional force in the main damper stage and generation of respective prestressing forces, this torsional vibration damper has a large number of parts which make the construction complicated and cost-intensive.

A clutch disk is known from DE 33 13 850 A1, which likewise has an idling damper stage and a load damper stage. The idling damper stage is formed by a damping spring arrangement which acts between a flange, projecting radially from the hub element, and a hub disk which surrounds the flange on both sides in the axial direction. A second second damping spring arrangement then acts between said hub disk and covering-disk elements arranged in the axial direction on both sides of the hub disk. The axial centering of the hub-disk arrangement constructed in this manner is provided by a bearing ring which lies between the flange provided on the hub element, and a disk-like section of the hub disk. A prestressing spring acts between the flange and the other disk-like section of the hub disk located on the other axial side of the flange to produce a prestressing force for the axial bearing. Furthermore, a friction device for the load damper stage is provided, which comprises a friction ring, located between one of the covering-disk elements and the disk-like region of the hub disk adjacent to said covering-disk element, and a prestressing spring which acts between the friction ring and said disk-like region of the hub disk. This arrangement also generated the prestressing forces for the axial centering and for the generation of frictional force in the load damper stage using separate prestressing springs which each act on different components, i.e. bearing or friction rings.

SUMMARY OF THE INVENTION

It is therefore an object of the present invention is to provide a torsional vibration damper which has a simplified construction and takes up less constructional space.

According to the invention, this and other objects are achieved by a torsional vibration damper for disposition in a clutch disk, comprising a hub element, a hub-disk assembly which is mounted on the hub element by means of a bearing assembly, the bearing assembly being prestressed by a first prestressing means in the bearing seat against the hub element. The hub-disk comprises a first transmission and a second transmission arrangement, which is rotatable about an axis of rotation in relation to the first transmission, a first damping means, preferably a damping spring, acting between the first and the second transmissions and a friction device to generate a friction damping force at a relative rotation between the first and second transmissions. The friction device comprises at least one friction element acted upon by a second prestressing means and is displaceable on at least one of the first and second transmissions at a relative rotation with generation of the friction damping force.

In the torsional vibration damper according to the invention, the bearing assembly forms at least one part of the at least one friction element. Since the bearing assembly in the torsional vibration damper according to the invention therefore provides a dual function, the installation of additional friction elements can be eliminated, so that, on the one hand, the construction is simplified and, on the other hand, the constructional space taken up by said additional friction elements can be saved or used for other components.

In the torsional vibration damper according to the invention, the construction is preferably such that one transmission of the first and second transmissions has an essentially disk-like configuration, and that the other transmission of the first and second transmissions comprises a covering-disk element on each axial side of the disk-like one transmission. The two covering-disk elements are connected to one another so as to be fixed against rotation, and the bearing assembly lies within a frictional region between the disk-like one transmission and one of the covering-disk elements of the other transmission.

In order to be able to generate the prestressing force for the axial bearing of the hub-disk assembly in a simple manner, it is proposed that the second prestressing means act between the disk-like one transmission and the other one of the covering-disk elements to prestress the disk-like one transmission in the direction of the one covering-disk element such that the frictional region of the bearing is clamped between the disk-like one transmission and the one covering-disk element to generate the friction damping force.

Generally, torsional vibration dampers of this type have a problem in that they are provided to transmit torque between two components which are not rotating exactly about the same axis. This means that the two components to be connected may have a slight offset in axis or an inclined axis. A very rigid design of the torsional vibration damper would result in nonround running or excessive abrasion of the torsional vibration damper in the regions subjected to various degrees of stress being generated by the offset in axis or the inclined axis. To prevent this from happening, the bearing assembly comprises a bearing ring with an essentially cone-like, spherical or similar bearing surface, which prestresses the bearing ring into the bearing seat against a counter-bearing surface shaped in an essentially complementary manner to the hub element.

In order to ensure that the bearing ring generates a frictional force in a defined manner, the bearing ring is connected to the first transmission or the second transmission so as to be essentially fixed against rotation.

It can thus be achieved that, irrespective of the degree of relative rotation or rotational acceleration, the friction is always generated between the same surfaces of the bearing ring and the transmissions.

Furthermore, it can be provided that the bearing ring comprise at least one coupling section for coupling said bearing ring to one transmission of the first and second transmissions.

The first prestressing means can be supported, on the one hand, on the hub element and, on the other hand, on the first or second transmission on which the bearing assembly is displaceable with generation of the friction damping force.

Here it is preferably provided that the first prestressing means is supported on the other covering-disk element of the other transmission.

In order to be able to provide a multistage mode of operation of the torsional vibration damper, i.e. to be able to provide a different damping characteristic in idling operation than in load operation, it is proposed that there be provided a third transmission which is connected to the hub element so as to be fixed against rotation or is integral therewith, and a second damping means, preferably a damping spring means, which acts between the third transmission and one of the first and second transmissions.

A particularly space-saving construction, in which even loading of different components can be ensured, can be obtained if the first and second transmission are configured to be essentially symmetrical in both axial directions in relation to the third transmission.

For this purpose, for example, it may be provided that the third transmission is essentially of disk-like configuration, and the first or second transmission connected to the third transmission arrangement via the second damping arrangement, comprises two disk regions, which are each arranged on an axial side of the third transmission arrangement, in a region which radially overlaps the third transmission.

In order to generate the respective pretensioning forces, the first and/or the second prestressing means comprises a prestressing spring, preferably a corrugated washer, plate spring or the like.

According to a further embodiment, the present invention provides a torsional vibration damper which comprises a hub element, a hub-disk assembly which is mounted on the hub element by means of a bearing assembly, the bearing assembly being prestressed by a first prestressing means in the bearing seat against the hub element, the hub-disk assembly comprising a first transmission and a second transmission rotatable about an axis of rotation in relation to the first transmission, and a first damping means, preferably a damping spring, acting between the first and the second transmissions. The bearing assembly comprises a bearing ring having an essentially cone-like, spherical or similar bearing surface which prestresses the bearing ring into the bearing seat against a counter-bearing surface of the hub element, shaped in an essentially complementary manner. A friction device generates a friction damping force at a relative rotation between the first and second transmissions. The friction device comprises at least one friction element which is acted upon by a second prestressing means and is displaceable on at least one transmissions of the first and second transmission arrangements at a relative rotation with generation of a friction damping force. A third transmission is connected to the hub element so as to be fixed against rotation or is integral therewith and a second damping arrangement, preferably a damping spring means, which acts between the third transmission and one transmission of the first and second transmissions to enable relative rotation to take place between the third transmission and the one of the first and second transmissions.

In this torsional vibration damper according to the invention, it is provided that at least the one of the first and second transmission arrangements on which the second damping means acts is configured to be essentially symmetrical in both axial directions in relation to the third transmission.

With a design of this type, it is also possible to provide an arrangement of axially small construction, in which any offset in axis present or an inclined axis of the components to be connected to one another for rotation can be compensated for by providing the cone-like or spherical bearing surfaces. The cone-like, spherical or any other similar type of bearing surface or counter-bearing surface is one which permits mutual deflection of the two components mounted against one another in the manner of a ball joint or the like. In the bearing surface here, for example, both a convex and a concave spherical design of the surface are possible, in which case the counter-bearing surface should naturally be of complementary shape to avoid load peaks.

In this case, it is preferably provided that the second damping means is accommodated in the axial direction essentially within the axial extent of the one transmission in the region of the interaction of the latter with the second damping.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The present invention is described in detail below based on preferred embodiments with reference to the attached drawings, in which.

DETAILED DESCRIPTION OF THE PRESENTLY PREFERRED EMBODIMENTS

Figure 1:
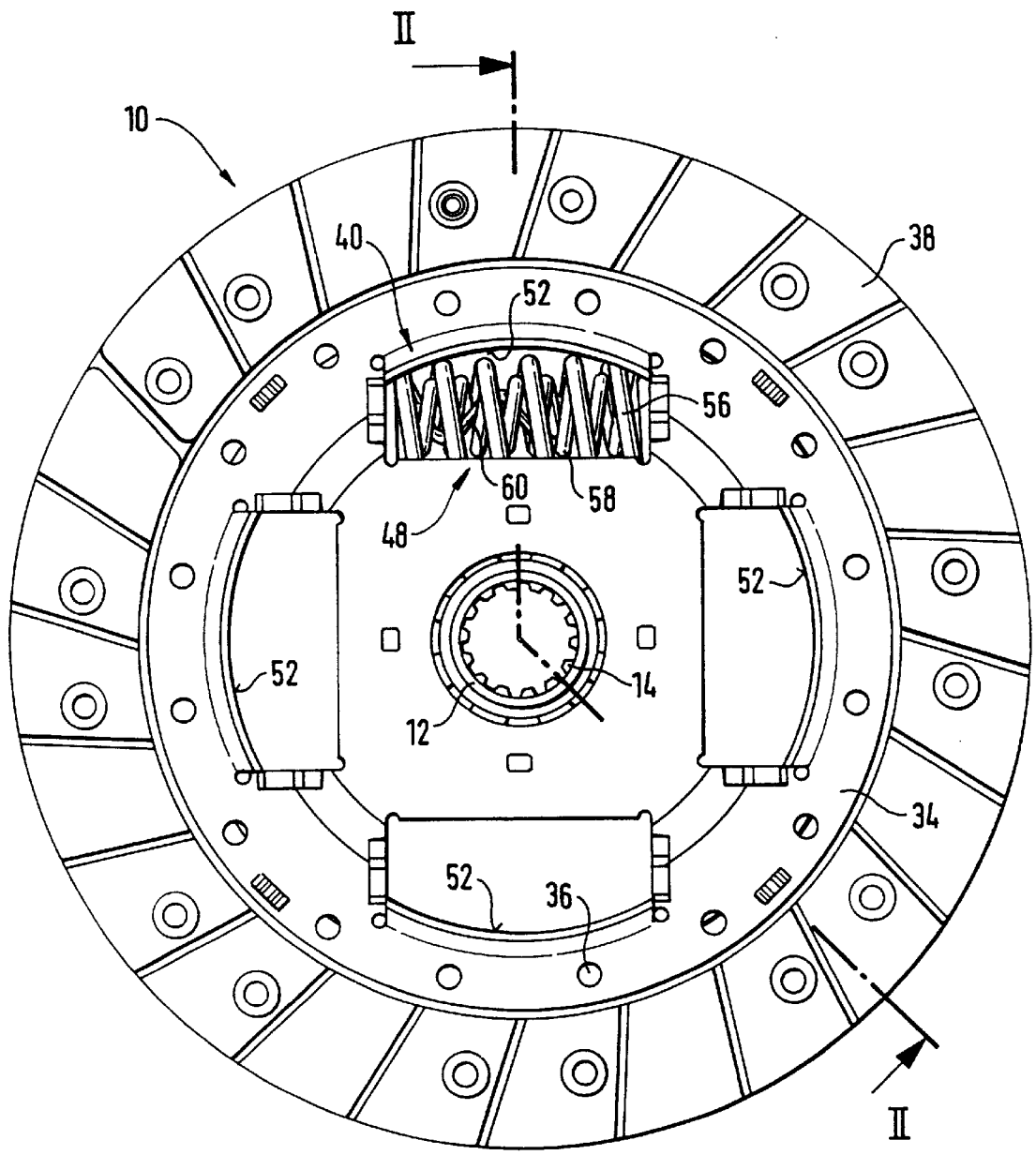
FIG. 1 is an axial view of a torsional vibration damper according to the embodiment of the invention.
Figure 2:
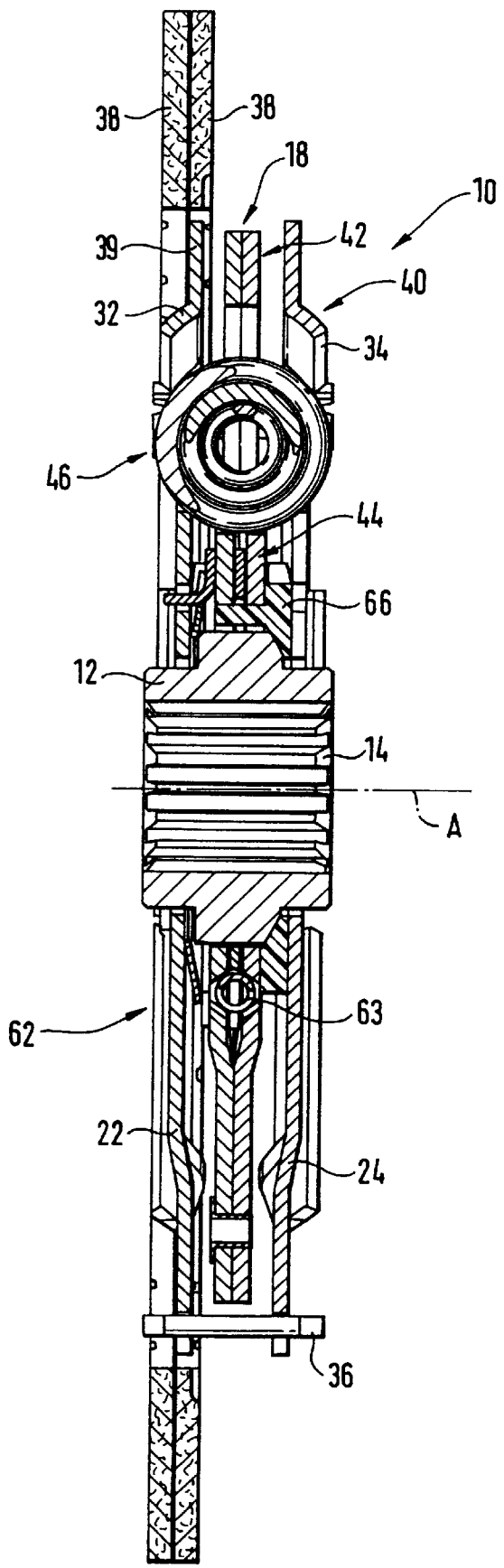
FIG. 2 is a sectional view taken along line II—II of FIG. 1.
Figure 3:
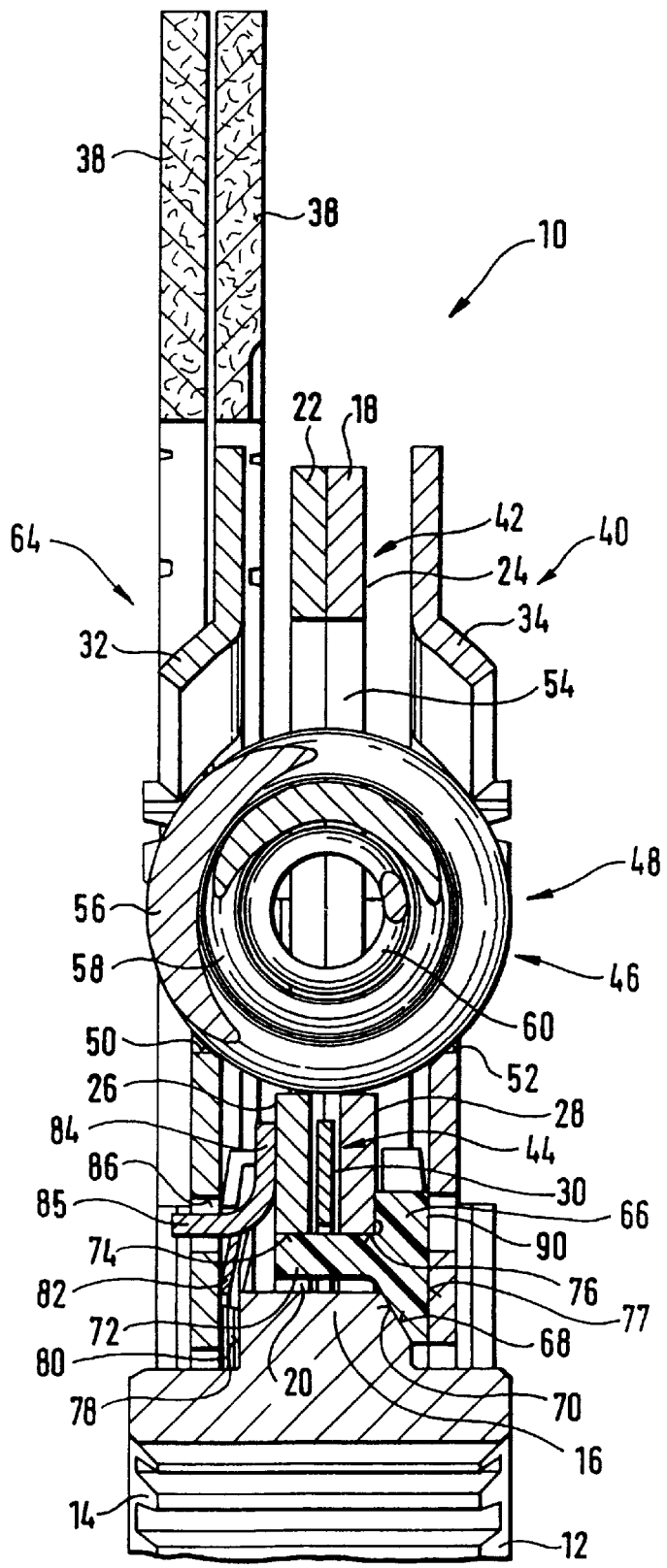
FIG. 3 is an enlarged view of the upper portion of FIG. 2.

FIGS. 1 to 3 show a first embodiment of a torsional vibration damper 10 according to the invention, which is constructed here as a clutch disk. It should be pointed out that a construction of a torsional vibration damper, such as is illustrated and described here, can also be used in other areas, for example in a double-mass flywheel or as a torsional vibration damper in a torque converter.

The clutch disk 10 has a hub element 12 having an internal toothing 14 which can be connected in a manner known per se to a gear input shaft so as to be fixed against rotation. In its radially outer region, the hub element 12 has a toothing 16 in which a corresponding internal toothing 20 of a hub disk 18 engages, so that teeth 16, 20 enable a predetermined circumferential backlash of hub disk 18 to take place in relation to hub element 12. It can be seen, in particular in FIG. 3, that the hub disk 18 is made up of two disk parts 22, 24 which rest against one another in their radially outer region. In their radially inner region, disk parts 22, 24, are axially spaced from one another and lie within respective disk regions 26, 28 on both sides of flange or disk part 30 which is connected to the hub element 12 so as to be fixed against rotation. Located in the axial direction on both sides of the hub disk 18 are covering-disk elements 32, 34 which are firmly connected to one another in a manner known per se by means of spacer pins or the like 36. In the embodiment illustrated, for example, the two covering-disk elements 32, 34, of which the covering-disk element 32, which can be seen on the left in FIG. 3, bears the friction linings 38 of the clutch disk 10, may be denoted as a first transmission 40. The hub disk 18, formed from the two disk parts 22, 24, can be denoted as a second transmission 42, and the flange or the disk part 30, which is connected to the hub element 12 so as to be fixed against rotation, can be denoted as a third transmission 44. It should be pointed out that the friction linings 38 may be supported in the axial direction against one another or against a lining bearer 39 in a manner known per se by means of a lining spring system.

Acting between the first transmission 40 and the second transmission 42 is a first damping means 46. The first damping means comprises, as shown in FIG. 1, damping spring arrangements 48 which are arranged, on the one hand, in spring windows 50, 52 of the covering-disk elements 32, 34 and, on the other hand, in an assigned spring window 54 of the hub disk 18 and are supported there in the circumferential direction or approximately in the circumferential direction on respective cam edges. It can be seen in FIGS. 1 to 3 that each damping spring arrangement 48, of which four are provided distributed in the circumferential direction in the embodiment illustrated, comprises three springs 56, 58 and 60 which are intertwined with one another, i.e. located concentrically one inside the other. The springs 56 and 58 extend over the entire length of the respective spring windows and are thus supported against the respective control cams at the circumferential end regions even under no-load operation. The innermost spring 60 is shorter in length and, in the no-load state or under only slight loading, rests against the assigned spring windows only in one end region. The operation of this damping spring arrangement 46 will be described below.

Also acting between the second transmission 42 and the third transmission 44 is a second damping means 62 which has a plurality of damping springs 63, distributed in the circumferential direction, which are accommodated in respective spring windows 23, 25 of the disk parts 22, 24 of the hub disk 18 on the one hand and of the flange or disk part 30 on the other hand. Damping means 62 forms an idling damper, whereas first damping means 46 forms a main or load damper.

The covering-disk elements 32, 34, the hub disk 18, the damping means 46, 62 and parts which interact with said components form a hub-disk assembly 64 which is mounted on the hub element 12 via a bearing ring 66. For this purpose, the bearing ring 66 has a bearing surface 68 which is of cone-like configuration and rests on a counter-bearing surface 70, configured in a complementary manner to the toothing 16, of hub element 12. It should be pointed out here that, instead of the cone-like design, a spherical design or any other design may also be provided, which enables slight tilting or radial deflection of Hub-disk assembly 64 to take place in relation to hub element 12. Furthermore, bearing ring 66 has a plurality of coupling projections 72, distributively arranged in the circumferential direction, which engage in recesses 74, 76 in the respective disk parts 22, 24 and thus hold the bearing ring 66 securely against rotation in relation to hub disk 18 and also provide radial fixing of hub disk 18 and thus of the entire hub-disk assembly 64 in relation to the bearing ring 66. Furthermore, the bearing ring 66 rests with a frictional surface 77 against covering-disk element 34 as shown in FIG. 3.

In order to fix or center hub-disk assembly 64 axially in relation to hub element 12, a prestressing spring 80, for example a corrugated washer, plate spring or the like, acts between a radial shoulder 78 of the toothing 16 of hub element 14 and the covering-disk element 32 (FIG. 3). Prestressing spring 80 prestresses the entire hub-disk arrangement 64 to the left in FIG. 3 and thus ensures that bearing surface 68 of bearing ring 66 is seated in the bearing seat on hub element 12, i.e. the counter-bearing surface 70 thereof. For example, a friction ring, supporting ring or the like may be arranged between radial shoulder 78 and spring 80 or between the spring 80 and covering-disk element 32.

Furthermore, a second prestressing spring 82, for example again a corrugated washer or plate spring or the like, presses a supporting ring 84, of essentially L-shaped cross section, against hub disk 18 and, during the process, is supported on covering-disk element 32. The supporting ring 84 includes axial extensions 85 which engage in recesses 86 in covering-disk element 32 and is thus held securely against rotation in relation to said covering-disk element and thus the first transmission 40.

The functioning of a torsional vibration damper constructed in this way is described below.

In a state in which only weak torques or torque fluctuations are to be transmitted via clutch disk 10 illustrated in FIGS. 1 to 3, the transmission arrangements 40, 42 and 44 are in normal positions in which the springs of the respective damping means 46 and 62 are essentially relieved from stress or are relieved from stress to the greatest possible extent. If the torque to be transmitted increases or if torque fluctuations arise, the springs 63 of the damping means 62 are first compressed and, in the process, are supported in one end region against the control cams of the spring windows 23, 25 in respective disk parts 22, 24 and, in the other region, against the control cams of the disk-like flange 30. In this relative rotation, the first and second transmissions 40, 42 thus rotate together relative to the third transmission 44 because the springs 56, 58, 60 of the first damping means 46 are essentially not compressed yet on account of their greater spring rigidity. In this relative rotation, friction occurs in the region of the support of the pre-stressing spring 80 on radial shoulder 78 of the hub element 12 or on the covering-disk element 32. Furthermore, friction occurs due to bearing surface 68 and counter-bearing surface 70 sliding along one another. Since hub disk 18 is displaced together with covering-disk elements 32, 34, no friction occurs in the region of the friction surface 77 of bearing ring 66.

If the torque increases or more severe torsional vibrations arise, the springs 63 of second damping means 62 are compressed until teeth 20 and 16 on hub disk 18 and hub element 12, respectively, come to rest against one another in the circumferential direction and thus prevent further rotation of hub disk 18, that is to say the second transmission 42, in relation to hub element 12. Only when this rotational limitation for the damping second means 62 becomes effective are the springs 56, 58 of first damping means 46 first compressed while being supported against the control cams of the covering-disk elements 32, 34 on the one hand or the disk parts 22, 24 on the other hand. A relative rotation now occurs between the first transmission 40 and the second transmission 42, and a relative rotation occurs between first transmission 40 and hub element 12. This means that friction (i.e. a basic friction which acts in the entire range of rotation) is again generated by the support of spring 80 on the radial surface 78 of toothing 16 of hub element 12 on the one hand and the covering-disk element 32 on the other hand. Friction is then generated in the region of the friction surface 77 of bearing ring 66, since the latter is clamped with a frictional region 90, extending between hub disk 18 and covering-disk element 34, in the axial direction due to the prestressing effect of prestressing spring 82 between the covering-disk element 32 and the disk part 22 of the hub disk 18. Since hub disk 18 does not rotate in relation to hub element 12, no friction occurs in the region of bearing surface 68 or counter-bearing surface 70.

If the torque to be transmitted increases further or the torque fluctuations continue to increase, springs 56, 58 are compressed to the extent that spring 60 between the assigned control cams is now also compressed, and that a further spring becomes effective in each damping spring arrangement 48. This means that a graded spring characteristic is also provided in the working range of the main damper, i.e. the damping means 46. However, the frictional effect generated by bearing ring 66 and also the frictional effect generated by spring 80 act over the entire working range of the load or main damper.

It can be seen that, in the clutch disk 10 according to the invention, second damping means 62 and first damping means 46 are connected in series, i.e. damping means 46 will essentially only become effective when the damping means 62 is bridged by a rotational limitation. In the individual damping means 46 and 62 the respective springs 56, 58, 60 and 63 act in parallel.

On account of the design of both the second transmission 42 and first transmission 40 being symmetrical in relation to the flange or disk part 30, (i.e. the construction of this transmission is essentially the same in both axial directions) an arrangement which is extremely short in the axial direction can be provided. This is additionally assisted by the fact that no separate friction device has to be provided, such as is the case in the prior art, since the function of the friction device for the main damper stage or load damper stage is performed by friction ring 66.

Figure 4:
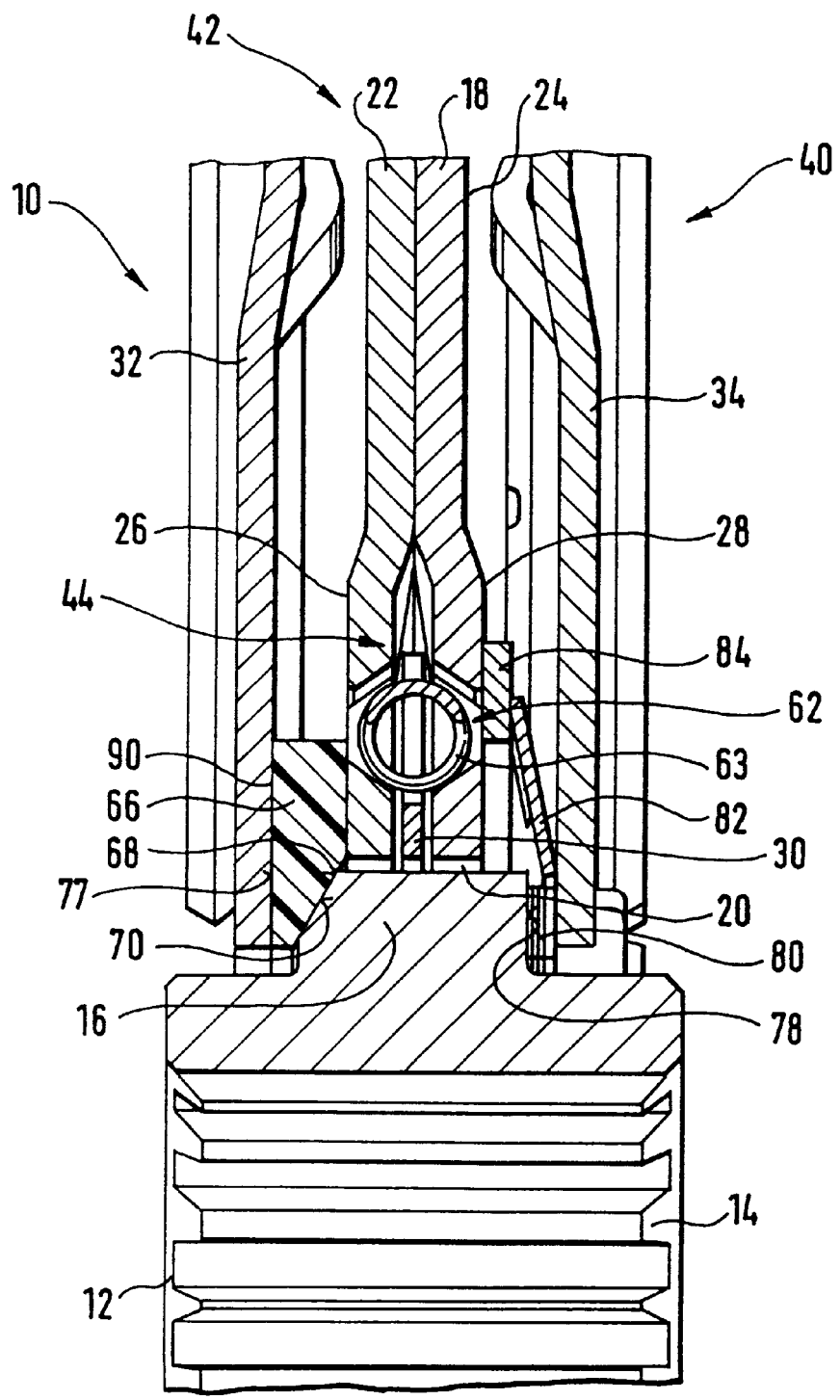
FIG. 4 is a partial view, corresponding to FIG. 3, showing an alternative embodiment of the torsional vibration damper according to the inventor.

FIG. 4 shows a modification of the embodiment according to FIGS. 1 to 3. Components which correspond in terms of construction or function to components described previously are denoted by the same reference numerals.

In the embodiment according to FIG. 4, bearing ring 66 is arranged in the axial direction between covering-disk element 32 and disk part 22 of hub disk 18. Now acting between covering-disk part 34 and disk part 24 is prestressing spring 82 which is again supported on hub disk 18 via a supporting ring 84 and thus supplies the prestressing force for the friction damping force to be generated in the region of the friction surface 77. The spring 80 now acts between covering-disk element 34 and the radial shoulder 78 of hub element 12. So far the embodiment according to FIG. 4 corresponds to the construction of FIGS. 1 to 3 and constitutes only a mirror-inverted representation. However, there is one difference in the fact that the bearing ring 66 is now freely rotatable both in relation to covering-disk element 32 and to hub disk 18. This applies correspondingly to supporting ring 84, via which spring 82 is supported on hub disk 18. This means that if relative rotations occur between the first and the second transmissions 40 and 42 bearing ring 66 and supporting ring 84 will rotate together with that component with which they have the greater static friction. This means that bearing ring 66 can rotate either with the covering-disk element 32 or with disk part 22 or it may possibly even slip in relation to both parts. The same applies to the supporting ring 84 (i.e., it can rotate with disk part 24 or with spring 82 or it can rotate in relation to both parts). It should be pointed out that, in the embodiment shown in FIG. 4 and in the embodiment according to FIGS. 1–3, a sliding frictional force can be generated in the region of the support of spring 82 on the respective covering-disk element 34 or 32. This will be the case when a greater static frictional force is generated by the support of springs 82 on supporting ring 84 in this region than by the support of said spring 82 on the assigned covering-disk element 34 or 32.

The functioning of the embodiment of FIG. 4 corresponds to the embodiment described previously, so that reference can be made to the above explanations.

The present invention provides a torsional vibration damper, for example in the form of a clutch disk, which, with an axially small constructional size, provides friction devices which act separately both for the idling damper and for the load damper and can operate essentially independently of one another. This is primarily due to the fact that the springs used to generate the frictional force, i.e. the prestressing force for respective friction elements, act independently of one another. Since the first and the second transmissions are designed to be essentially symmetrical in the axial direction in relation to the third transmission, and since the bearing ring takes over the function of a friction device for both the load damper and the idling damper, components can be omitted, which simplifies the construction and contributes to saving costs.

It is pointed out that wherever it has been reported here that the bearing assembly, i.e. the bearing ring, is prestressed into the bearing seat on the hub element, this can mean direct contact between said two components, but it can also mean that the bearing ring is supported on the hub element with interposition of any kind of supporting components which may then also form the counter-bearing surface. Also the statement that the friction element, i.e. in the present case the bearing ring, is displaceable on one of the transmissions to generate a friction damping force can mean that said element slides directly along a corresponding component of the assigned transmission or is supported on said transmission with interposition of supporting components which may possibly be firmly connected to said transmission. This means that there may be direct contact here too, or the support or the generation of frictional force may be provided with interposition of components.

The invention is not limited by the embodiments described above which are presented as examples only but can be modified in various ways within the scope of protection defined by the appended patent claims.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A torsional vibration damper comprising:
    a hub element having a central axis;
    a bearing assembly for mounting a hub disk assembly on said hub element;
    a first pre-stressing device for pre-stressing said bearing assembly in a bearing seat against said hub element;
    a hub disk assembly comprising:
        a first transmission axially mounted about said central axis;
        a second transmission axially mounted about said central axis and being rotatable with respect to said first transmission; and
        a first damping device acting between said first and second transmissions;
    friction means for generating a friction damping force at a relative rotation between said first and second transmissions, said friction means comprising:
        at least one friction device displaceable on at least one of said first and second transmissions at the relative rotation with generation of the friction damping force; and
        a second pre-stressing device acting on said at least one friction device, wherein said bearing assembly forms at least one part of said at least one friction device, one of said first and second transmissions comprising a disk configuration, and the other of said first and second transmissions comprising a first and second covering-disk element, each disposed on an axial side of said disk transmission, said covering-disk elements being connected to one another so as to be fixed against rotation; and
    a frictional region formed between said disk one transmission and said second covering-disk element of the other of said transmissions, said bearing assembly being disposed in said frictional region, said second pre-stressing device acting between said disk transmission and said first covering-disk element by pre-stressing said disk transmission in the direction of said second covering-disk element such that said frictional region is clamped between the disk transmission and said first covering-disk element to generate the friction damping force.

2. The torsional vibration damper as claimed in claim 1, wherein said bearing assembly comprises a bearing ring having a be a ring surface with a shape, and said hub element further comprising a counter-bearing surface having a shape complementary to said bearing surface shape, said bearing ring being pre-stressed into the bearing seat against said counter-bearing surface.

3. The torsional vibration damper as claimed in claim 2, wherein said bearing surface shape is one selected from a group consisting of conical and spherical.

4. The torsional vibration damper as claimed in claim 2, wherein said bearing ring is connected to one of said first and second transmissions so as to be fixed against rotation.

5. The torsional vibration damper as claimed in claim 2, wherein said bearing, ring comprises at least one coupling section for coupling said bearing ring to one of said first and second transmissions.

6. The torsional vibration damper as claimed in claim 1, wherein said first pre-stressing device is supported by said hub element and the one of said first and second transmissions on which said bearing assembly is displaceable with generation of the friction damping force.

7. The torsional vibration damper as claimed in claim 1, further comprising:
    a third transmission connected to said hub element so as to be fixed against rotation; and
    a second damping device acting between said third transmission and one of said first and second transmissions.

8. The torsional vibration damper as claimed in claim 7, wherein said first and second transmissions are symmetrical in both axial directions in relation to said third transmission.

9. The torsional vibration damper as claimed in claim 8, wherein said third transmission comprises a disk configuration, and said one of said first and second transmissions which is connected to said third transmission by said second damping device comprises two disk regions each being disposed on an axial side of said third transmission in a region which radially overlaps said third transmission.

10. The torsional vibration damper as claimed in claim 1, wherein said first and second pre-stressing devices comprise a pre-stressing spring, said pre-stressing spring being one selected from a group consisting of a corrugated washer and a plate spring.

11. A torsional vibration damper comprising:
    a hub element having a central axis;
    a bearing assembly for mounting a hub disk assembly on said hub element;
    a first pre-stressing device for pre-stressing said bearing assembly in a bearing seat against said hub element;
    a hub disk assembly comprising:
        a first transmission axially mounted about said central axis;
        a second transmission axially mounted about said central axis and being rotatable with respect to said first transmission; and
        a first damping device acting between said first and second transmissions;
    friction means for generating a friction damping force at a relative rotation between said first and second transmissions, said friction means comprising:
        at least one friction device displaceable on at least one of said first and second transmissions at the relative rotation with generation of the friction damping force; and
        a second pre-stressing device acting on said at least one friction device, wherein said bearing assembly forms at least one part of said at least one friction device, one of said first and second transmissions comprising a disk configuration, and the other of said first and second transmissions comprising a first and second covering-disk element, each disposed on an axial side of said disk transmission, said covering-disk elements being connected to one another so as to be fixed against rotation; and a frictional region formed between said disk one transmission and said second covering-disk element of the other of said transmissions, said bearing assembly being disposed in said frictional region, said first pre-stressing device being supported on said first covering-disk element of the other of said transmissions.

12. The torsional vibration damper as claimed in claim 11, wherein said bearing assembly comprises a bearing ring having a bearing surface with a shape, and said hub element further comprising a counter-bearing surface having a shape complementary to said bearing surface shape, said bearing ring being pre-stressed into the bearing seat against said counter-bearing surface.

13. The torsional vibration damper as claimed in claim 12, wherein said bearing surface shape is one selected from a group consisting of conical and spherical.

14. The torsional vibration damper as claimed in claim 12, wherein said bearing ring is connected to one of said first and second transmissions so as to be fixed against rotation.

15. The torsional vibration damper as claimed in claim 12, wherein said bearing ring comprises at least one coupling section for coupling said bearing ring to one of said first and second transmissions.

16. The torsional vibration damper as claimed in claim 11, wherein said first pre-stressing device is supported by said hub element and the one of said first and second transmissions on which said bearing assembly is displaceable with generation of the friction damping force.

17. The torsional vibration damper as claimed in claim 11, further comprising:

a third transmission connected to said hub element so as to be fixed against rotation; and a second damping device acting between said third transmission and one of said first and second transmissions.

18. The torsional vibration damper as claimed in claim 17, wherein said first and second transmissions are symmetrical in both axial directions in relation to said third transmission.

19. The torsional vibration damper as claimed in claim 18, wherein said third transmission comprises a disk-like configuration, and said one of said first and second transmissions which is connected to said third transmission by said second damping device comprises two disk regions each being disposed on an axial side of said third transmission in a region which radially overlaps said third transmission.

20. The torsional vibration damper as claimed in claim 11, wherein said first and second pre-stressing devices comprise a pre-stressing spring, said pre-stressing spring being one selected from a group consisting of a corrugated washer and a plate spring.

* * * * *